July 4, 1961   R. WEISS   2,990,756
PHOTOGRAPHIC CAMERA
Filed March 9, 1960                                         2 Sheets-Sheet 1

July 4, 1961  R. WEISS  2,990,756
PHOTOGRAPHIC CAMERA
Filed March 9, 1960
2 Sheets-Sheet 2

United States Patent Office 2,990,756
Patented July 4, 1961

2,990,756
PHOTOGRAPHIC CAMERA

Richard Weiss, Braunschweig, Germany, assignor to Franke & Heidecke, Fabrik Photographischer Präzisions-Apparate, Braunschweig, Germany, a firm of Germany
Filed Mar. 9, 1960, Ser. No. 13,904
Claims priority, application Germany Mar. 12, 1959
9 Claims. (Cl. 95—10)

The present invention relates to a photographic camera having a shutter and diaphragm adjusting mechanism for semi-automatically setting exposure values in accordance with the indications of an exposure meter. More particularly, the invention provides for including other factors in the exposure value setting, such as film speed and filter factor.

An object of the invention is to provide a new and improved exposure value setting mechanism of the type wherein the speed and diaphragm adjusting rings are interconnected by a differential gear and coupled with the follow-up pointer of a built-in exposure meter.

Another object is the provision of a new and improved exposure value setting mechanism having a differential gear arrangement and incorporating a film speed adjustment.

Still another object is to provide a new and improved arrangement for including various factors such as film speed and filter factor in a device coupled to the follow-up pointer of an exposure meter for setting exposure values on a camera of the twin lens reflex type.

These and other desirable objects may be attained in the manner disclosed as an illustrative embodiment of the invention in the following description and in the accompanying drawings forming a part hereof, in which.

The same reference numerals throughout the several views indicate the same parts.

The present invention is intended especially for use with a photographic camera having a mirror reflex focusing and viewfinding chamber, the problems in connection with adjustment of shutter speed and diaphragm aperture in such cameras being somewhat different than in other types of cameras. While the present invention may be applied to various forms of twin lens reflex cameras, it is here disclosed by way of example as applied to a twin lens reflex camera of the kind identified by the trademark "Rolleiflex," manufactured by the firm of Franke & Heidecke, of Braunschweig, Germany, and widely known and used throughout the United States. The following disclosure of the invention presupposes familiarity with the main constructional features of the "Rolleiflex" camera. For those not already familiar with the construction of this camera, reference may be made to the book "Rollei Photography, Handbook of the Rolleiflex and Rolleicord Cameras," by Jacob Deschin, published in 1952 by Camera Craft Publishing Company, of San Francisco, California.

Figures 1, 2:
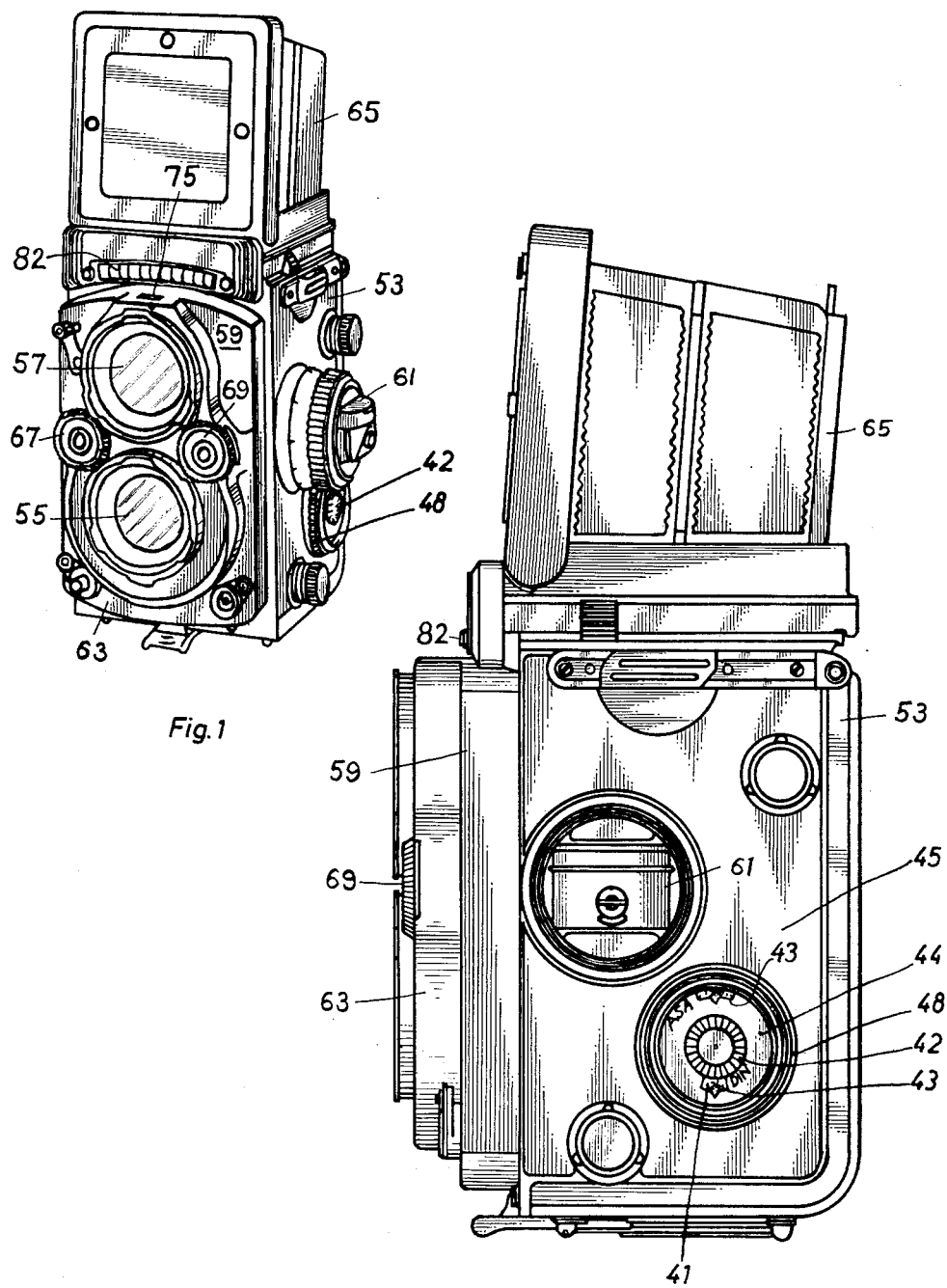
FIG. 1 is a perspective view of a twin lens reflex camera embodying the exposure value setting mechanism according to the invention.
FIG. 2 is a side elevational view of the camera of FIG. 1.

Referring to FIGS. 1 and 2, the camera includes a main body 53, a picture taking lens 55, a viewfinder lens 57, and a lens board or camera front member 59 on which the lenses 55 and 57 are mounted, this lens board 59 being movable forwardly and backwardly for focusing purposes, by means of a focusing knob 61 mounted on the left side wall of the camera. This is the right wall as viewed from the front in FIG. 1, but the words "right" and "left" are used in the present application from the customary standpoint of the photographer standing behind his camera.

An objective shutter of any convenient kind is mounted at the picture taking lens 55 and, together with its adjusting mechanism and associated parts, is enclosed within the objective support or casing 63. When the shutter is opened, light enters through the lens 55 and passes into the main exposure chamber in the lower part of the camera body 53, to expose the film contained therein. Light also enters through the finder lens 57, which has no shutter, and passes into the focusing chamber in the upper part of the camera body, and falls upon a focusing screen of ground glass or the like on which the sharpness of the image can be seen when a focusing hood 65 at the top of the camera is opened to normal viewing position as shown. The shutter of the lens 55 is provided with the usual two adjustments, one being the shutter speed adjustment operated by rotating a knob 67, the other being the aperture adjustment or iris diaphragm adjustment, controlled by turning a knob 69.

Rotation of the knob 67 is transmitted to a scale drum 1 bearing a circumferentially graduated shutter speed scale 71, while rotation of the adjusting knob 69 is transmitted to another scale drum 2 bearing a circumferentially graduated diaphragm aperture scale 73. The connection between the knobs 67 and 69 and the respective scale drums 1 and 2 may, for instance, take the form illustrated in Patent No. 2,912,914, to R. Weiss, granted Nov. 17, 1959. In this patent it is more completely explained that the scale drums 1 and 2 are mounted for rotation about the axis of the upper viewing lens 57, within the casing 63. Movements of the scale drums 1 and 2 are visible through a window 75 at the top of the housing 63, so that the user of the camera, holding the camera at chest level or waist level, can look downwardly onto the top of the casing 63 and see, through the window 75, the speed for which the shutter is set and the aperture or diaphragm opening for which the shutter is set.

The scale drums or index rings 1 and 2 are interconnected by a differential gear 3 for the setting of exposure values. The gear 3 is rotatable about the pin 4 fixed to and extending radially inwardly of a carrier ring 5 rotatable about the optical axis of the upper finder lens 57 between the rings 1 and 2. Portions of the adjacent peripheral edges of the rings 1 and 2 are toothed and in meshing engagement with the gear 3 at its opposite sides.

The rings 1 and 2 serve as the run rings of a differential gearing system, while the gear 3 serves as a planet gear. With this arrangement, adjustment of the rings 1 and 2 by an equal amount in opposite directions produces a complementary change in the shutter speed and diaphragm aperture, so that the planet gear 3 merely rotates about the pin 4 without circumferential travel. Thus, rotation of the adjusting knobs 67 and 69 by a like amount in opposite directions corresponds to a complementary change in shutter speed and diaphragm aperture without changing the exposure value. On the other hand, rotation of the knobs 67 and 69 and the rings 1 and 2 in opposite directions by different amounts, or in the same direction, corresponds to a non-complementary change of shutter speed and diaphragm aperture, and a change in the exposure value. This non-complementary adjustment while changing the exposure value results in circumferential travel of the planet gear 3 and the carrier ring 5, so that the angular position of the carrier ring 5 is indicative of the exposure value set on the shutter.

The carrier ring 5 has external teeth 6 over a portion of its periphery which are in meshing engagement with a gear 13. The gear 13 is part of an intermediate gearing also including the coaxially mounted gears 11 and 12, the latter meshing with the gear 13. The end gear 11 is fixed to the gear 12 and is in meshing engagement with the toothed edge of a flange 10 on a vertical slide 7, constituting a rack.

The slide 7 is mounted within the casing 59, 63 for vertical movement along a line 77 approximately parallel to the front of the casing and perpendicular to the optical axis 79 of the index rings 1 and 2 and the viewing lens 57. The slide 7 has a pair of vertical slots 8 at either side of the flange 10, in each of which is engaged a stud 9 secured in the casing 59, 63. By this arrangement, it can be seen that rotation of the carrier ring 5 is transmitted through the intermediate gearing 11, 12, and 13 to cause corresponding linear movement of the slide 7. The vertical position of the slide 7 perpendicular to the optical axis 79 thus varies in accordance with the exposure value set on the shutter.

The slide 7 has a rearwardly extending arm 14 which extends parallel to the objective axis 79 and projects into the camera body 53. The arm 14 has a control slot 15 likewise extending parallel or approximately parallel to the optical axis 79, and in which slides a pin 16 carried by one end of a lever 17 arranged within the camera housing 53. The pin and slot connection between the arm 14 and the lever 17 allows the lens board 59, with which the slide 7 is movable, to be adjusted backwardly and forwardly with respect to the camera body 53 for focusing.

The rear end of the lever 17 has a pin 18 for pivoting it to one end of a bellcrank lever 19. The bellcrank lever 19 is pivoted about a fixed pin 20 within the camera housing 53 and is acted upon by a spring 21 secured at one end within the camera housing 53 and tending to turn the bellcrank lever 19 in a clockwise direction, to draw the pin 18 and lever 17 rearwardly. The other end of the lever 19 has a sidewardly projecting pin 22 which is urged by the spring 21 constantly into engagement with the peripheral cam surface of a setting cam 23. The setting cam 23 is rotatably mounted on a shaft 24 secured within the camera body 53. The cam 23 carries a sidewardly projecting pin 25 which is in driving engagement with a coupling member 26, see FIG. 4, secured to the inner end of a shaft 27 of a scale knob to be presently described for introducing the factors of film speed and filter factor, if desired. The coupling member 26 desirably has a bifurcated end between which the pin 25 on the cam 23 is engaged, whereby rotation of the cam 23 is transmitted to the coupling member 26 and the scale shaft 27.

Disposed approximately in the middle of the lever 17 is a pin 28 against which the lower end of a slide 29 bears, the slide 29 being urged downwardly by a spring 30 anchored at one end within the housing or body 53 and at its other end on a pin projecting to the side on the slide 29. The slide 29 is guided for movement approximately perpendicular to the length of the lever 17 in a groove-like guide in a front to rear extending frame member 31 within the camera body 53.

The top end of the slide 29 is engaged by a laterally extending pin 32 at the front end of a crank 33 which is secured at its rear end to a pin 34 rotatable in an appropriate portion of the camera body 53. To the other end of the pin 34 is rigidly secured a cam 35 bearing on a pin 36 at one end of another crank 37 secured at its other end to a shaft 38 mounted for rotation within a bore in a suitable portion of the structure within the camera body 53. The shaft 38 is secured to the follow-up pointer 39 of an exposure meter.

The exposure meter has a measuring mechanism indicated diagrammatically at 81, and has an indicating pointer 40 which assumes a position depending upon the brightness of the object being measured. As can be seen in FIG. 1, the measuring mechanism 81 of the exposure meter, which may be of a galvanometer type, may be connected to a photosensitive cell or a group of cells 82 mounted on the front of the camera body 53 above the movable front lens board 59. Although not here shown, the crank 33 is spring biased so that its pin 32 constantly follows the motion of the slide 29, and the crank 37 may likewise be spring biased so that the pointer 39 follows the motion of the cam 35. With this arrangement, adjustments of the lever 17 resulting in a vertical displacement of the pin 28 are transmitted to the slide 29, and thence to the follow-up pointer 39 until the pointer 39 is in alinement with the meter pointer 40. The position of the meter pointer 40 is a non-linear function of the brightness or light intensity, whereas the slide 29 moves linearly with respect to the exposure value. For this reason, the cam 35 is introduced and shaped to adapt the non-linearity of the exposure meter characteristic to the remainder of the mechanism.

Figure 4:
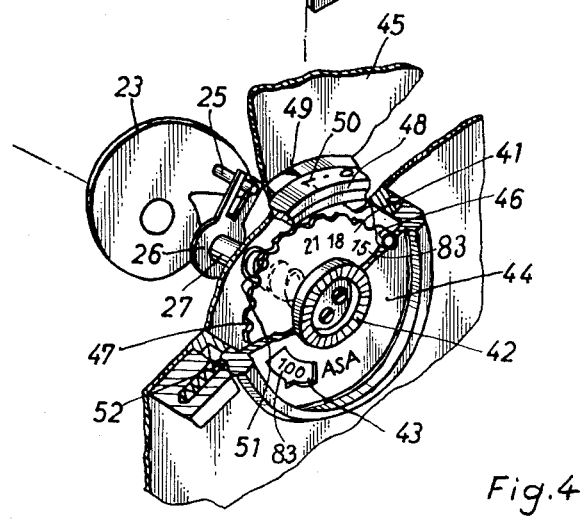
FIG. 4 is a view similar to FIG. 3 and constituting a rightward continuation thereof, showing another portion of the exposure value setting mechanism.

The previously mentioned scale knob shaft 27, FIG. 4, extends outwardly through the side wall 45 of the camera body. Secured to the outer end of the shaft 27 are a scale plate 41 and a knob 42 for rotating the scale plate 41 and shaft 27 together. The scale plate 41 is inscribed with a circumferentially extending and graduated film speed scale 83 according to the American ASA notation. If desired, the opposite side of the scale plate 41 may carry a corresponding film speed scale graduated in the Continental DIN units. The scale plate 41 is urged outwardly away from the side wall 45 by a spring 51 surrounding the shaft 27, however the scale plate 41 and shaft 27 may be moved inwardly to a small extent against the force of the spring 51 by pressing inwardly on the knob 42 which is preferably in the form of an annular flange fixed to the plate 41 and having a toothed or serrated outer end adapted to be pressed axially inwardly and simultaneously turned by a combined axial and rotary motion of the user's finger or thumb. It will be noted that the shape of the coupling member 26 having the bifurcated end in engagement with the pin 25 on the cam 23 is such that the coupling member 26 may be moved inwardly relative to the cam 23 along the pin 25 without changing the angular position of the cam 23.

The film speed scale plate 41 is covered by the front plate 44 of a knob 48 rotatably mounted on a sidewardly projecting mounting ring on the side wall 45. The front plate 44 has a window 43 for each of the film speed scales 83 and an index formed at the side of the window for setting the film speed at the appropriate value.

The knob 48 may, if desired, be held in a fixed rotational position, but it is preferable to have the knob 48 adjustable for introducing another factor into the exposure value setting, such as a filter factor. To this end, the periphery of the knob 48 is provided with a circumferentially graduated filter factor scale 50 readable in cooperation with a fixed mark 49 on the mounting ring carried by the side wall 45. A frictional latch such as the spring biased ball detent 52 is provided for releasably holding the knob 48 at a particular rotational position with the reference mark 49 indicating an appropriate filter factor value on the scale 50. A slight rotational force applied to the knob 48 releases the detent 52 for adjustment of the scale 50 to indicate a different value.

The scale plate 41 is releasably coupled to the knob 48 by a ball detent 46 on the knob 48 which is releasably engaged with one of a series of peripheral notches 47 on the scale ring 41. With the ball detent 46 engaged, rotation of the knob 48 to change the indicated value on the filter factor scale 50 is transmitted to the scale 41 without any change of the film speed which has been set. On the other hand, the film speed may be changed independently of the filter factor by depressing the knob 42 and scale plate 41 axially inwardly against the force of the spring 51 to release the ball detent 46 from one of the notches 47 and allow rotational adjustment of the scale plate 41 to change the film speed without changing the filter factor. Upon releasing pressure upon the knob 42, an appropriate notch 47 of the scale plate 41 reengages with the detent 46. Of course, it is clear in FIG. 4 that the film speed scale 83 and the filter factor scale 50 may be interchanged, or that other scales may be substituted which have an effect upon the exposure value setting.

To review the operation, the appropriate film speed and filter factor are decided and set on the camera. To set the filter factor, the knob 48 is grasped with the hand and turned with a slight pressure to release the engagement of the ball detent 52. The appropriate value on the filter factor scale 50 is alined with the reference mark 49. Through the engagement of the ball detent 46 on the knob 48 with the notches 47 of the scale plate 41, the shaft 27 connected to the scale plate 41 is rotated by a corresponding amount, as a result of which the coupling member 26 engaging the pin 25 on the cam 23, turns the cam 23 to the corresponding rotational position.

To set the film speed while keeping the filter factor constant, the knob 42 is pressed inwardly against the force of the spring 51 to release the notch 47 from the ball detent 46. Thereafter the knob 42 may be angularly adjusted together with the scale plate 41 until the appropriate film speed value on the film speed scale 83 appears in the window 43. Either the American ASA scale or the Continental DIN scale may be used. Through this adjustment, the angular position of the coupling member 26 is adjusted by a corresponding amount, as is the position of the cam plate 23.

Figure 3:
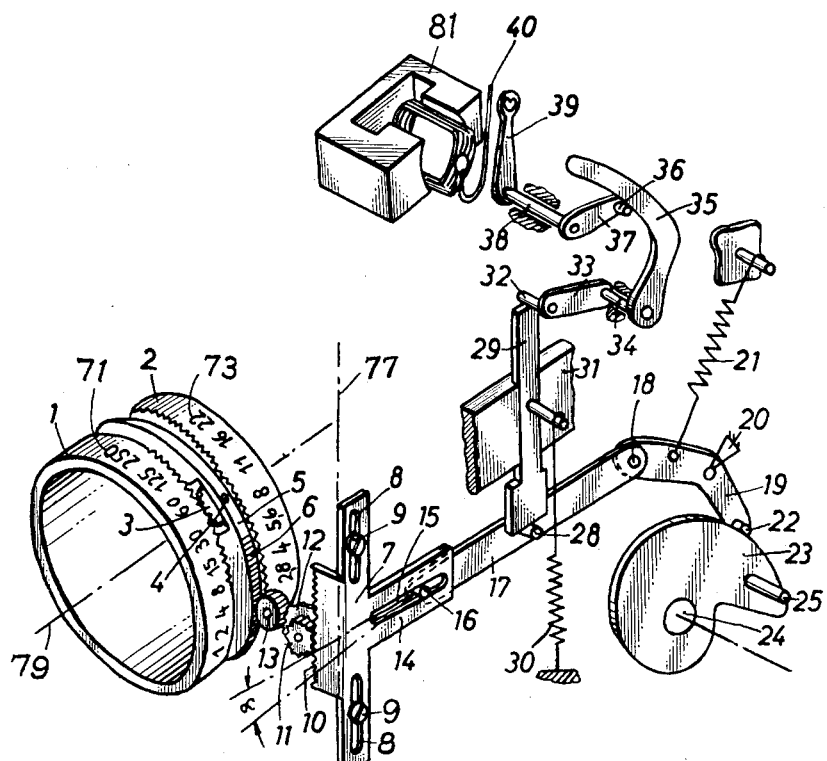
FIG. 3 is an exploded schematic perspective view of a portion of the exposure value setting mechanism.

As can be seen in FIG. 3, the pin 22 at one end of the bellcrank 19, which has a fixed pivot 20, is held against the periphery of the cam 23 under the force of the spring 21. The other end of the bellcrank 19 is pivoted to the rear end of the lever 17, as a result of which the rear end of the lever 17 assumes a position in dependence upon the angular position of the cam 23. As the angular position of the cam 23 depends upon the film speed and filter factor set, it follows that the position of the rear end of the lever 17 is set in accordance with the film speed and filter factor selected.

The exposure meter 81 has an indicating pointer 40 which assumes a position in dependence upon the brightness of the object to be photographed as measured by the photoelectric cell 82. The follow-up pointer 39 is brought into coincidence with the meter pointer 40 as a result of adjusting the shutter speed adjusting knob 67 and the diaphragm aperture adjusting knob 69 on the front of the camera. Rotation of the adjusting knobs 67 and 69 in the same direction, or in opposite directions by different amounts, produces a change in exposure value which adjusts the position of the follow-up pointer 39. Due to the interconnection of the shutter speed scale ring 1 and the diaphragm aperture scale ring 2 by the differential gear 3, a non-complementary change in shutter speed and diaphragm aperture values producing a change in exposure value results in circumferential travel of the gear 3 and the carrier ring 5. Angular adjustment of the carrier ring 5 causes linear movements by a corresponding degree of the slide 7, through the intermediate gearing 11, 12, and 13. In this manner, the front end of the lever 17, whose pin 16 is slidable in the slot 15, assumes a position in dependence upon the exposure value set.

The lever 17 thus has two operative points, one of which is connected to the differential of the exposure value setting mechanism, while the other is coupled with the externally adjustable scale knob 41, 50. A third operative point 28 of the lever 17 is coupled to actuate the follow-up pointer 39. Movement of the pin 28 on the lever 17 is transmitted to the slide 29, which is biased by the spring 30. The pin 32 of the crank 33 is connected through the shaft 34 to the cam 35, the pin 32 being biased against the top of the slide 29 so that the cam 35 assumes a position in dependence upon the position of the slide 29. The cam 35, bearing on a pin 36 of the crank 17, adjusts the angular position of the follow-up pointer 49.

Adjustment of the scale rings 1 and 2 to produce a change in exposure value thus produces a vertical adjustment of the pin 16 at the front end of the lever 17, the resulting vertical movement of the pin 28 being transmitted to the follow-up pointer 39 to result in a change in the position of the pointer 39. The adjustment is continued until the follow-up pointer 39 is in coincidence with the exposure meter pointer 40.

In the preferred embodiment which has been described, the slot 15 is arranged parallel to the optical axis 79 of the finder lens 57. The slot 15 may, however, be formed at an inclination to the optical axis 79, at an angle alpha as indicated in FIG. 3, or may be curved, in order to influence the linkage 17 to take into account automatically the change in the effective speed of the lens for a given aperture, as the lens is moved closer to or farther from the focal plane during focusing. This effect is well known in the art, and is sometimes called the "bellows extension" factor.

It may be noted that the lever 17 and associated mechanism may be confined to the side of the camera body 53 and movable casing 63, to conserve space within the remainder of the camera for other mechanism. The invention nicely provides for a film speed and filter factor adjustment, or only one of them, in an exposure value differential setting mechanism, and in a constructional form well suited to a twin lens reflex camera such as a "Rolleiflex" camera.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A photographic camera comprising a camera body and an objective support having at least one lens defining an optical axis, said objective support being mounted on said camera body for axial displacement, shutter speed and diaphragm aperture setting means on said objective support including a pair of rings mounted for rotation about said optical axis, a differential gear interconnecting said pair of rings, an exposure meter having an indicating pointer mounted on said camera body, a follow-up pointer, a lever in said camera body having three operative points, means for coupling one of said operative points with said differential gear, the second of said operative points being coupled with said follow-up pointer, and the third of said operative points being coupled to an externally adjustable scale knob, said scale knob bearing at least one scale which is set at a selected value, and said speed and diaphragm setting means being adjusted to move said lever to bring said follow-up pointer into coincidence with said meter pointer.

2. A construction as defined in claim 1, wherein said means for coupling said differential gear with said one operative lever point includes a slide movably mounted on said objective support and having an arm in which is formed a slot guide extending parallel to said optical axis, said slide being coupled with said differential gear, and said lever having a pin slidably received in said guide slot.

3. A construction as defined in claim 2, wherein said differential gear is mounted on a toothed carrier ring rotatably mounted about said optical axis, and wherein said slide is provided with a rack, and intermediate gearing between said toothed carrier ring and rack for adjusting said slide in dependence upon the angular position of said carrier ring.

4. A construction as defined in claim 1, wherein said second operative point is at the middle of said lever, and wherein the coupling between said second operative point and follow-up pointer includes a cam for matching the exposure meter characteristics.

5. A photographic camera comprising a camera body and an objective support having at least one lens defining an optical axis, said objective support being mounted on said camera body for axial displacement, shutter speed and diaphragm aperture setting means on said objective support including a pair of rings mounted for rotation about said optical axis, a differential gear interconnecting said pair of rings, an exposure meter having an indicating pointer mounted on said camera body, a follow-up pointer, a lever in said camera body having three operative points, one of said operative points being coupled with said differential gear, the second of said operative points being at the middle of said lever and coupled with said follow-up pointer, means for coupling the third of said operative points with an externally adjustable scale knob having a setting cam, said scale knob bearing at least one scale which is set at a selected value, and said speed and diaphragm setting means being adjusted to move said lever to bring said follow-up pointer into coincidence with said meter pointer.

6. A construction as defined in claim 5, wherein the third of said operative points is at the rear end of said lever, said means for coupling said third operative point with said scale knob setting cam including another lever biased non-positively into engagement with the periphery thereof.

7. A construction as defined in claim 5, wherein said scale knob comprises an external knob rotatably mounted on the side wall of said camera body and bearing a first scale readable in cooperation with a fixed mark on said side wall, a scale plate coupled with said setting cam and bearing a second scale readable in cooperation with an index on said external knob, and detent means between said scale plate and external knob.

8. A construction as defined in claim 7, wherein said scale plate has a knob projecting through said external knob to be externally adjustable independent of adjustment of said external knob.

9. A construction as defined in claim 7, wherein said first scale is graduated in terms of filter factors and said second scale is graduated in terms of film speeds.

References Cited in the file of this patent

UNITED STATES PATENTS

| | | |
|---|---|---|
| 2,923,216 | Greger | Feb. 2, 1960 |
| 2,925,760 | Broschke | Feb. 23, 1960 |
| 2,926,571 | Sommer | Mar. 1, 1960 |
| 2,935,920 | Rentschler | May 10, 1960 |
| 2,938,440 | Bretthauer | May 31, 1960 |